UNITED STATES PATENT OFFICE.

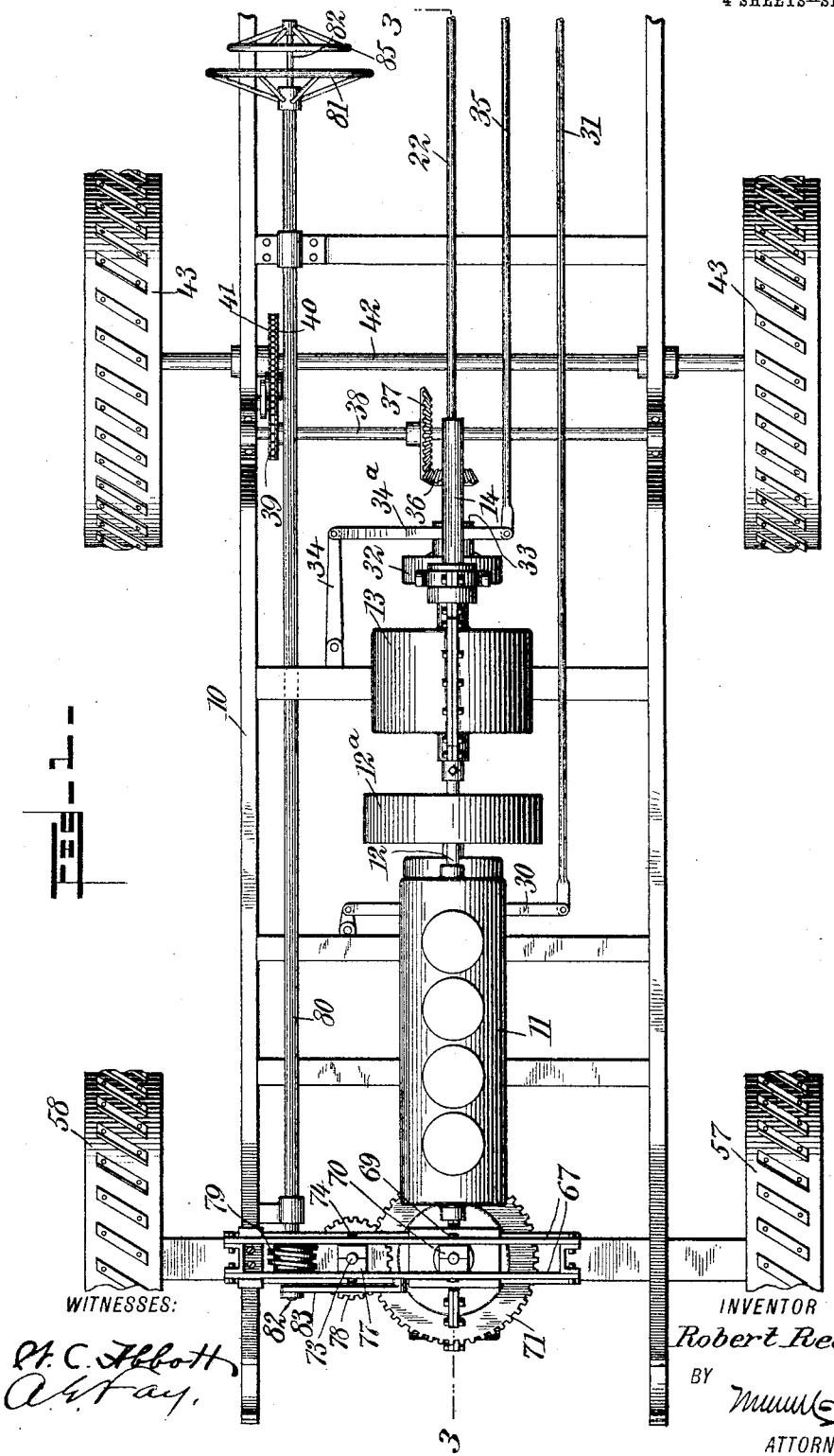

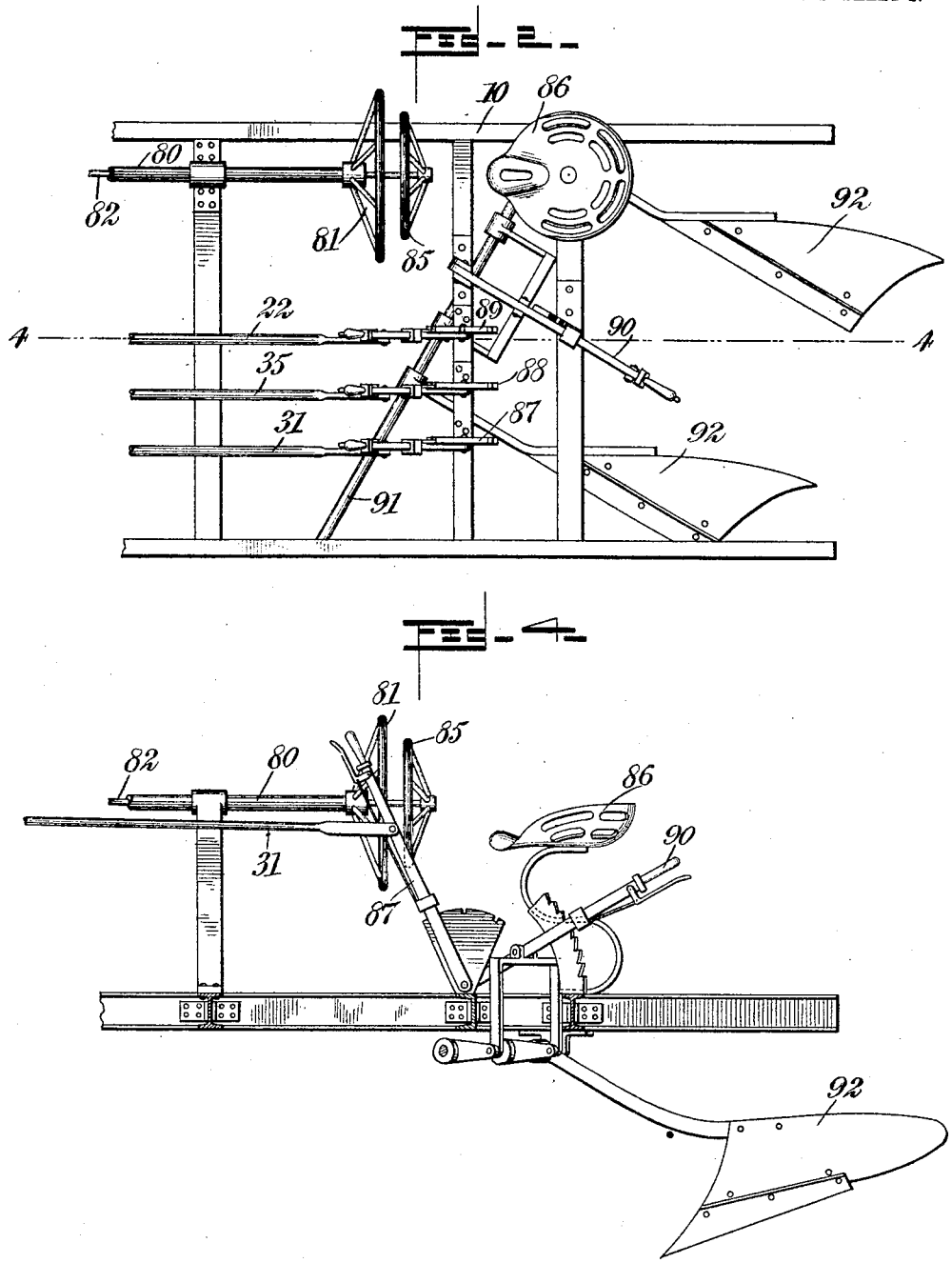

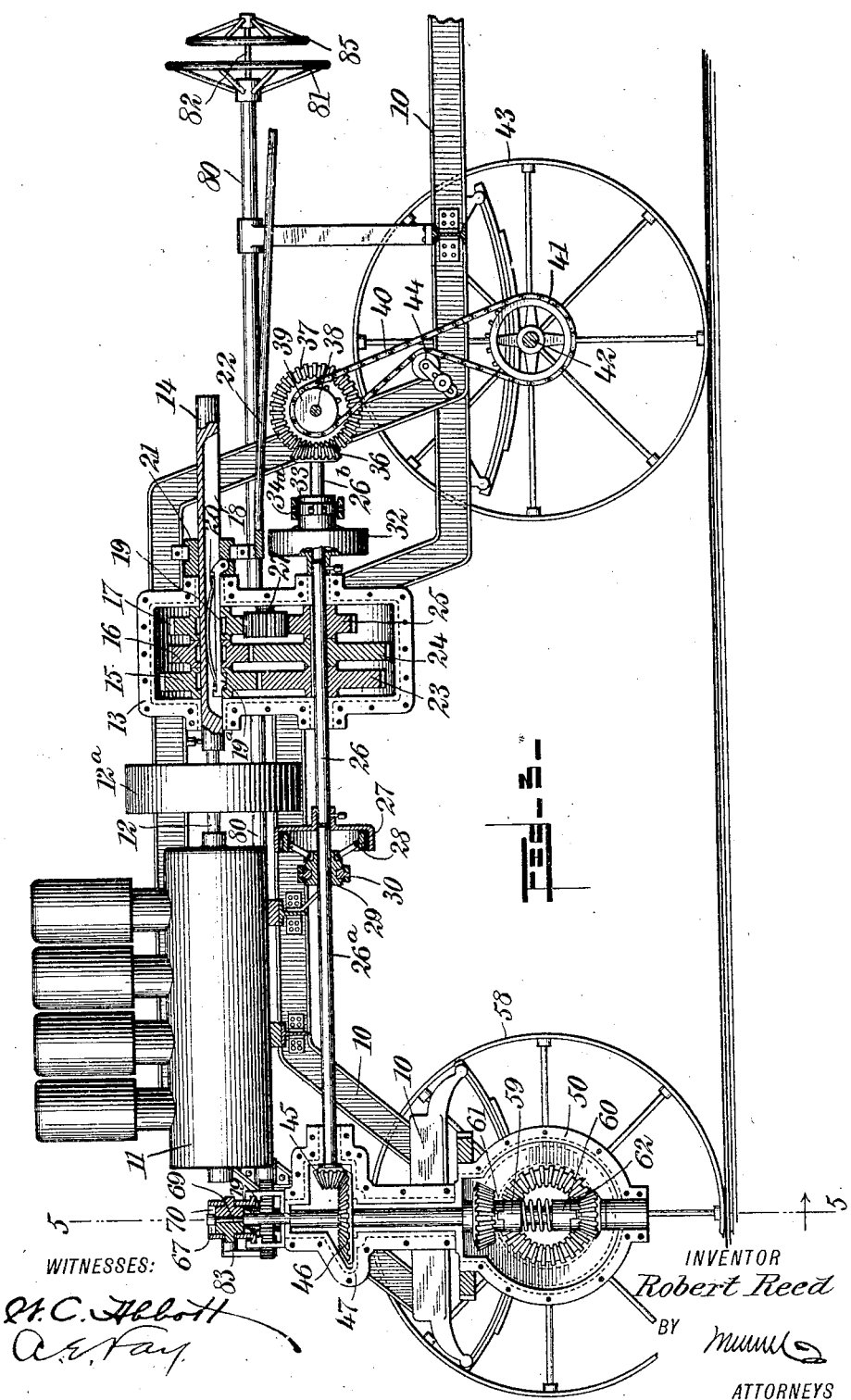

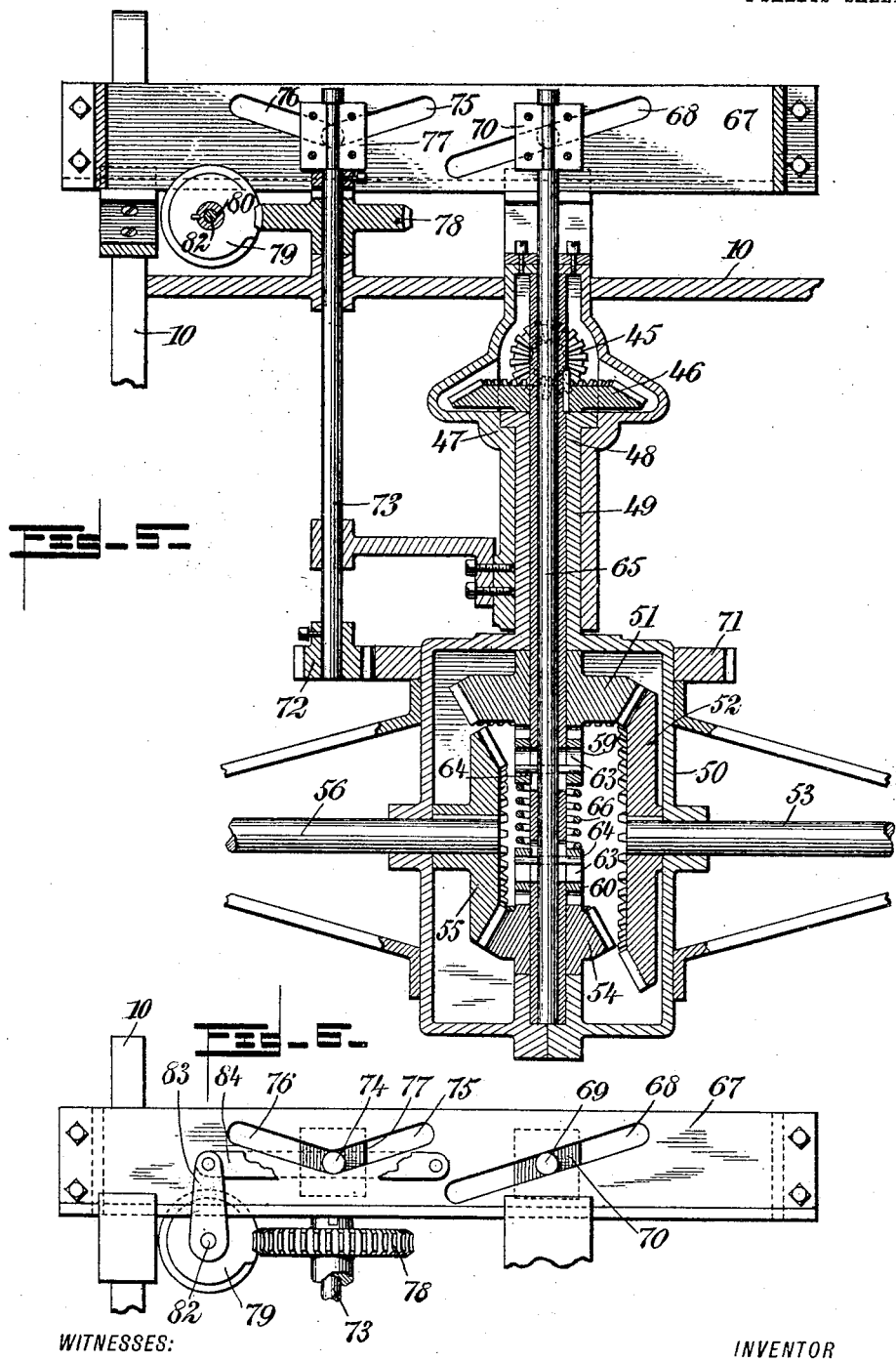

ROBERT REED, OF LOGANSPORT, INDIANA.

TRACTION-ENGINE.

No. 803,361.　　　　　Specification of Letters Patent.　　　　Patented Oct. 31, 1905.

Application filed October 28, 1904. Serial No. 230,329.

*To all whom it may concern:*

Be it known that I, ROBERT REED, a citizen of the United States, and a resident of Logansport, in the county of Cass and State of Indiana, have invented a new and Improved Traction-Engine, of which the following is a full, clear, and exact description.

My invention relates to a traction-engine which is capable of general use, but is especially adapted for agricultural purposes and to which many kinds of farm implements may be applied.

The principal object of the invention is to provide a device of the character mentioned which will operate any kind of a farm implement that can be drawn by horses or a motor.

A further object is to provide means whereby the power can be transmitted to all of the wheels upon which it operates.

A further object is to provide means for turning the vehicle about sharp corners by the operation of the motor itself and to provide additional manually-operated steering means.

A further object of the invention is to provide means for applying the power at will to the rear and front wheels or to either alone and for changing the speed and direction of motion by the simple operations performed by the operator of the device.

Reference is to be had to the accompanying drawings, forming a part of this specification, in which similar characters of reference indicate corresponding parts in all the figures.

Figure 1 is a plan view of a portion of a machine embodying one form of my invention. Fig. 2 is a fragmentary plan view of the rear of the same machine, showing a plow mounted thereon. Fig. 3 is a vertical sectional view on the line 3 3 of Fig. 1. Fig. 4 is a vertical sectional view on the line 4 4 of Fig. 2. Fig. 5 is a sectional view, on an enlarged scale, on the line 5 5 of Fig. 3; and Fig. 6 is a front elevation, on an enlarged scale, of a portion of the operating mechanism.

10 represents the various parts of the frame of the machine, and it will be understood that these may be varied in accordance with the particular kind of an agricultural or other implement which it is desired to mount upon the machine and that the same frame may be used for different kinds of implements.

The machine may be driven by any desired kind of a motor—as, for example, a gasolene-motor 11. The motor is provided with a motor-shaft 12 and fly-wheel $12^a$. A casing 13 is mounted upon the frame of the machine, and through this casing passes an enlargement 14 of the shaft 12. Upon this enlargement are mounted a series of gears, the number of which may be varied according to the requirements. In the present instance three gears 15, 16, and 17 are shown. They are all rotatably mounted upon the enlargement 14, so that the operation of the motor and the rotation of the shaft 12 will not rotate these gears if they are opposed by any force or load unless they are connected with the enlargement 14.

A slot 18 is provided in the enlargement 14, and in this slot is located a key 19, which has a projection $19^a$, adapted to engage in a keyway in any one of the gears 15, 16, or 17. A spring 20 is provided for normally holding this projection in its seat when applied to one of the gears. The key is mounted upon a collar 21, which is capable of reciprocating upon the enlargement 14 and is operable by means of a rod 22, extending back of the machine to a position where it can be conveniently manipulated by the operator.

Three gears 23, 24, and 25 are rigidly mounted upon a shaft 26, which also passes through the casing 13, in which all of the gears mentioned are located. It will be obvious that the gears 15 and 16 always remain in engagement with the gears 23 and 24, respectively, and that whenever either of the first-mentioned gears is rigidly connected with the shaft 12 by means of the projection $19^a$ that gear will give rotary motion to the shaft 26 through the corresponding gear on that shaft. The gear 17 is connected with the gear 25 by means of an additional gear 27, and it will be obvious that when the projection $19^a$ fixes the gear 17 with respect to the shaft 12 motion will be imparted to the shaft 26 in a reverse direction. It will be apparent that the number of gears and the different changes in speed may be varied in accordance with the prevailing conditions.

In addition to the shaft 26 there are two other shafts $26^a$ and $26^b$ in line therewith, and these three shafts together constitute the several parts of the main shaft of the machine and will be so referred to hereinafter. Upon the part 26 of the main shaft is mounted a friction-cup 27, with which engage friction-jaws 28, which are capable of being operated by means of a sliding collar 29 and lever 30.

This lever 30 is operable by means of a rod 31, extending into convenient position for the operator. It will be obvious that the manipulation of this rod will cause the two parts 26 and 26ª of the main shaft to be connected and disconnected at will. A similar clutch 32 is employed to connect the parts 26 and 26ᵇ. A collar 33 is provided for manipulating this clutch, and a link 34, lever 34ª, and rod 35 similar to the other lever and rod are also provided.

Upon the part 26ᵇ of the main shaft is a gear 36, meshing with a gear 37 upon a transverse shaft 38. In the form illustrated in Fig. 3 this shaft is provided with a sprocket-wheel 39, over which runs a chain 40, engaging with a sprocket-wheel 41 upon the rear axle 42 of the vehicle. It will be obvious, however, that other means may be employed for connecting the main shaft with the rear axle and that the invention is not limited to any particular means for accomplishing this result. The rear wheels 43 are mounted upon the axle 42. The chain 40 may be tightened by means of an adjustable idler 44. Upon the opposite end of the main shaft and secured to the part 26ª is another gear 45, meshing with a gear 46, which is located in a frame 47 and is mounted upon a hollow vertical shaft 48. This hollow shaft turns in a bushing 49, to which is rigidly secured or upon which is integrally mounted a casing 50. Within this casing are mounted two sets of gears. A gear 51 is rotatably mounted upon the hollow shaft 48 and meshes with another gear 52, rigidly mounted upon a shaft 53. In a similar manner a gear 54 is rotatably mounted upon the shaft 48 and is in engagement with a gear 55, rigidly mounted upon a shaft 56. Upon the outer end of the shaft 53 is mounted a wheel 57, and upon the outer end of the shaft 56 is mounted another wheel 58. These are the front wheels of the vehicle, and the shafts 53 and 56 together constitute the front axle thereof. It will be observed that the gears 51 and 52 are larger than the gears 54 and 55 and that the proportions between them are the same, so that the shafts 53 and 56 will be rotated at the same speed. It will also be understood that as the gears 51 and 54 are rotatably mounted upon the shaft 48, which is rotated by the main shaft, means must be provided for rigidly connecting these gears with the main shaft when it is desired to operate the front axle, and for a purpose to be described means is also provided for placing one of these gears in engagement with the hollow shaft while the other is not in engagement therewith and also for placing them both in engagement with the hollow shaft when it is desired to do so. This means will now be described.

The gears 51 and 54 have located adjacent to them on the hollow shaft clutches 59 and 60. These clutches are provided with projections 61 and 62, respectively, which are adapted to engage with corresponding depressions in the gears 51 54. Each of these clutches is provided with an elongated slot 63, through which extends a pin 64. A rod or shaft 65 extends throughout the length of the hollow shaft 48 and is adapted to slide longitudinally therein. The pins 64 are fixed in the rod 65, and it will be understood that the rod 65, shaft 48, and clutches 59 and 60 necessarily rotate together on account of the position of the pins 64, and, further, it will be readily understood that when the projections 61 and 62 are forced into engagement with the corresponding depressions upon the two gears 51 and 54 the latter will rotate with the shaft 48. A spring 66 is provided for normally forcing the clutches into this position, as shown in Fig. 3, so that under ordinary circumstances both shafts 53 and 56 will be caused to rotate in the same direction and at the same speed by the part 26ª of the main shaft. When it is desired, however, to turn the front axle and front wheels about the shaft 48 as a pivot for the purpose of causing the vehicle to take a sharp turn, one of the gears 51 or 54 may be disengaged from its clutch, so that the other one alone receives power from the main shaft. In this case the wheel which is not rotating will act as a pivot and the other wheel will roll around it, so that the axle may easily take a position at ninety degrees from its original position—that is, parallel with the central line of the vehicle. It will be readily seen that the cramping of the wheels in this manner may be accomplished in either direction, according to which gear is disengaged from the hollow shaft. The manner of accomplishing this result which I have illustrated is to force the rod 65 in either direction from the position shown in Figs. 3 and 5. If forced down, it will pull the clutch member 59 away from the gear 51 and disengage it therefrom, so that motion will be imparted to the shaft 56 only. On the other hand, if the rod 65 is pulled up it will disengage the clutch 60 from the gear 54 and the shaft 53 will do the work required. When the wheels are cramped, as stated above, the power may be thrown off from the rear axle by operating the clutch 32 and then both clutches 59 and 60 brought into engagement with the gears 51 and 54. Upon then starting the motor in the usual manner the vehicle will be turned around upon the rear wheels as pivots in an obvious way, and this may be accomplished either backwardly or forwardly according to the existing necessity. It will be understood that all these operations may be performed in succession without stopping the motor, so that in case the motor is used to operate the implement which may be attached to the vehicle the operation of the implement can be continued while these other operations are being performed.

As a means for reciprocating the rod 65 I have shown a sliding frame 67, having a cam represented in the figures by slots 68. Pins 69 work in the slots and are mounted upon a block 70, attached to the top of the rod 65. It will be evident that the forcing of the frame 67 in either direction from the position shown in Fig. 5 will cause one of the clutches 59 or 60 to be disengaged from its gear.

While turning the machine in the manner described above it will be obvious that all forward or backward motion thereof is stopped, and consequently it is desirable to have an additional steering means which can be used to turn small corners and to keep the machine running in a straight line. For this purpose a manually-operated device is preferably mounted in such a manner as to have connection with the frame upon which the wheels 57 and 58 are mounted. The form of this device which I have illustrated comprises a gear 71, mounted rigidly upon the casing 50 and concentrically with the shaft 48. Meshing with this gear is a gear or pinion 72, mounted on a shaft 73 and provided with pins 74, engaging in slots 75 and 76 in the sliding frame 67. These pins are preferably mounted on a block 77, mounted on the shaft 73, so that the shaft is free to turn in the block. The reciprocation of the sliding frame 67 will in addition to the operation of the rod 65 cause the gear or pinion 72 to be raised or lowered in an obvious manner. From the position shown in Fig. 5 a movement of the frame 67 in either direction in order to turn the front axle will cause the shaft 73 to rise and pull the gear or pinion 72 out of engagement with the gear 71. This is desirable for the purpose of preventing the turning of the axle from operating the parts connected with the shaft 73. When the rod 65 is restored to the position shown in Fig. 5, the operation of the slots 75 and 76 upon the pins 74 will cause the gear or pinion 72 to come into meshing engagement with the gear 71 and provide for steering the device as long as both shafts 53 and 56 are in position to be operated by the motor.

For the purpose of turning the gear 71 a worm-wheel 78 may be mounted upon the shaft 73 and engaged and operated by a worm 79 upon a hollow shaft 80, which extends to a place within the reach of the operator and is provided with a hand-wheel 81. Within the shaft 80 is a shaft 82. This shaft projects beyond the end of the hollow shaft 80, and upon its end is secured a lever 83, to which is connected a link 84. The other end of this link is pivotally connected with the sliding frame 67, and it will be evident that the oscillation of the shaft 81 will cause the reciprocation of the sliding frame 67 to perform the operations above mentioned. The shaft 82 is provided with a hand-wheel 85 for the purpose of operating it.

The seat for the operator is represented by the numeral 86, and it will be obvious that the hand-wheels 81 and 85 should be placed in proximity to this seat. Operating-levers 87, 88, and 89 are also pivotally mounted on the frame and attached to the rods 31, 35, and 22, respectively. An additional lever 90 may also be pivotally attached to the frame within reach of the operator upon a shaft 91 for the purpose of operating the agricultural implement which it is desired to mount upon the frame of the machine. In the present instance this implement is represented by plows 92; but it is to be understood that for these plows may be substituted any other desired implement and that where the implement is provided with moving mechanism, as is the case with a harvester, binder, &c., it can be operatively connected with the motor 11, so that the whole operation of the device can be performed by one motor.

While I have illustrated one embodiment of my invention, it will be readily understood that the latter is not limited thereto and that many modifications and changes may be made without departing from the spirit of the invention.

Having thus described my invention, I claim as new and desire to secure by Letters Patent—

1. In a traction-engine, the combination of a motor, a motor-shaft, a main shaft in a plurality of parts, means for transmitting power from the motor-shaft to one of said parts, means for transmitting power from each of the other parts of the main shaft for propelling the vehicle, and means for uniting the first-named part of the main shaft with any of the other parts, or with all of them at the same time.

2. In a traction-engine, the combination of a motor, a motor-shaft, a main shaft in a plurality of parts, means for transmitting power from the motor-shaft to one of the parts of the main shaft, connections from each of the other parts of the main shaft for propelling the vehicle, a series of clutches on the main shaft, one between each two parts thereof, and means for operating each of said clutches.

3. In a traction-engine, the combination of a motor, a motor-shaft, a main shaft in a plurality of parts, a plurality of axles, means for transmitting power from the motor-shaft to one of the parts of the main shaft, connections between each of the other parts of the main shaft and one of the axles, a series of clutches on the main shaft, one between each two parts thereof, and a lever for operating each of said clutches; said levers being provided with connections extending to the rear portion of the machine.

4. In a traction-engine, the combination of a motor, a motor-shaft, a main shaft in a plurality of parts, means for transmitting power from the motor-shaft to one of the parts of the main shaft, connections from each of the other parts of the main shaft for propelling the vehicle, a series of clutches on the main shaft, one between each two parts thereof, and a lever for operating each of said clutches.

5. In a traction-engine, the combination of a motor, a motor-shaft, a main shaft, means for transmitting power to the main shaft from the motor-shaft, a front axle, a rear axle, means for transmitting power to both axles from the main shaft, means for disconnecting either axle from the main shaft independently of the other axle and means connected with the motor for turning the front axle on a vertical axis.

6. In a traction-engine, the combination of a motor, a motor-shaft, a main shaft in three parts, a front axle, a rear axle, means for transmitting power from the motor-shaft to one of said parts, means for transmitting power from each of the other parts of the main shaft to one of the axles, means for uniting the first-named part of the main shaft with either of the other parts, or with both of them at the same time, and manually-operated means for turning the front axle on a vertical axis.

7. In a traction-engine, the combination of a frame, a motor thereon, a front axle, means for transmitting power from the motor to the front axle, a rear axle, means for transmitting power from the motor to the rear axle, means for rendering either of said transmitting means inoperative, means connected with the motor and operable therefrom for turning the front axle on a vertical axis, and additional manually-operated means for turning the front axle on a vertical axis.

8. In a traction-engine, the combination of a motor, a motor-shaft, a main shaft in three parts, a front axle, a rear axle, means for transmitting power from the motor-shaft to one of said parts, means for transmitting power from each of the other parts of the main shaft to one of the axles, means for uniting the first-named part of the main shaft with either of the other parts, or with both of them at the same time, and two means for turning the front axle on a vertical axis; one of said last-mentioned means being connected with and operated from the motor, and the other having connections for rendering it manually operable.

9. The combination of a motor, a motor-shaft, a main shaft, a front axle, a rear axle, means for transmitting power from the motor-shaft to the rear axle, a vertical shaft, means for transmitting power from the motor-shaft to the vertical shaft, and means for transmitting power from the vertical shaft to the front axle and for turning the front axle about a vertical axis.

10. The combination of a motor, a front axle, a rear axle, means for transmitting power from the motor to the rear axle, a hollow shaft, means for transmitting power from the motor to the hollow shaft, means for transmitting power from the hollow shaft to the front axle, and means for disconnecting the rear axle from the motor.

11. The combination of a motor, a main shaft, a front axle, a hollow vertical shaft, means for transmitting power from the motor to said shaft, means for transmitting power from the shaft to the front axle and for turning the front axle about a vertical axis, and additional manually-operated means for turning the front axle about said hollow shaft.

12. The combination of a motor, a rear axle, means for transmitting power from the motor to the rear axle, a front axle consisting of two parts rotatable independently of each other, means for transmitting power from the motor to both of said parts, or to either of them independently of the other, and means for disconnecting the rear axle from the motor.

13. The combination of a motor, a rear axle, means for transmitting power from the motor to the rear axle, a front axle consisting of two parts rotatable independently of each other, means for transmitting power from the motor to both of said parts, or to either of them independently of the other, means for disconnecting the rear axle from the motor, and manually-operated means for turning both parts of the front axle on an axis at an angle to their axes.

14. The combination of a motor, a rear axle, means for transmitting power from the motor to the rear axle, a front axle consisting of two parts rotatable independently of each other, means for transmitting power from the motor to both of said parts or to either of them independently of the other, a shaft located at an angle to said front axle, and means for operatively connecting said shaft with either of the parts of said axle and for connecting both of said parts with the shaft at the same time.

15. The combination of a motor, a rear axle, means for transmitting power from the motor to the rear axle, a front axle consisting of two parts rotatable independently of each other, means for transmitting power from the motor to both of said parts or to either of them independently of the other, a shaft located at an angle to said front axle, a pair of gears mounted on said shaft, a gear upon each of the parts of said front axle adapted to mesh with said first-mentioned gears, and means for causing either of said last-mentioned gears to assume operative engagement with the shaft and for removing them from operative engagement therewith.

16. The combination of a motor, a rear axle, means for transmitting power from the motor to the rear axle, a front axle consisting of two parts rotatable independently of each other, a shaft located at an angle to said parts, a pair of gears on said shaft, a gear on each of the parts of said front axle, means for transmitting power from the motor to said shaft, yielding means for normally holding said first-mentioned gears in operative engagement with the shaft, and means for disengaging them from the shaft.

17. The combination of a motor, a main shaft adapted to be operatively connected therewith, a hollow shaft, means for connecting said main shaft with said hollow shaft, a rod longitudinally slidable in said hollow shaft, a pair of gears mounted on said hollow shaft and rotatable independently thereof, means for holding said gears rigid with respect to the hollow shaft, and means for disengaging said means from the gears; said last-named means being connected with said rod.

18. The combination of a motor, a rear axle, means for operatively connecting the motor with the rear axle, a hollow shaft, means for operatively connecting the motor with the hollow shaft, a rod longitudinally slidable in the hollow shaft, a pair of gears mounted on the hollow shaft but rotatable independently thereof and of each other, two clutches on said rod each having a slot and each adapted to engage one of the gears to hold it rigid with respect to the clutch, and a pin passing through each of said slots and secured to the rod.

19. The combination of a motor, an axle, a hollow shaft, means for operatively connecting the motor with the axle and with the hollow shaft, a rod longitudinally slidable in the hollow shaft, a pair of gears mounted on the hollow shaft and rotatable independently thereof and of each other, a pair of clutches on said rod each having an elongated slot and each adapted to engage one of the gears to hold it rigidly with respect to the clutch, a pin passing through each of said slots and secured to the rod, and a spring for normally forcing said clutches into engagement with the gears.

20. The combination of a motor, an axle, a shaft, means for operatively connecting the motor with the axle and with the shaft independently of each other, a pair of gears mounted on the shaft, a second axle consisting of two parts, a gear on each of said parts adapted to mesh with one of said first-mentioned gears, a casing inclosing all of said gears, a gear mounted rigidly upon the casing, and means for rotating said last-mentioned gear.

21. The combination of a motor, two axles, one of said axles comprising two parts, a shaft, a pair of gears upon the shaft, a gear on each of said parts adapted to mesh with one of said first-mentioned gears, a casing inclosing all of said gears, a gear rigidly mounted upon the casing, and means for rotating said last-mentioned gear; said means comprising a gear or pinion meshing with the last-mentioned gear, a shaft with which said gear or pinion is connected, and a hand-wheel on said shaft.

22. In a traction-engine, the combination of a motor, an axle, a hollow shaft, means for connecting the axle and hollow shaft with the motor, two gears rotatably mounted on the hollow shaft, a second axle consisting of two parts in line with each other, a gear on each of said parts meshing with one of the first-mentioned gears, a clutch for rigidly connecting each of the first-mentioned gears with the hollow shaft, a rod in the hollow shaft connected with said clutches, and means for reciprocating the rod.

23. In a traction-engine, the combination of a motor, an axle, a hollow shaft, means for connecting the axle and hollow shaft with the motor, two gears rotatably mounted on the hollow shaft, a second axle consisting of two parts in line with each other, a gear on each of said parts meshing with one of the first-mentioned gears, a clutch for rigidly connecting each of the first-mentioned gears with the hollow shaft, a rod in the hollow shaft connected with said clutches, means for reciprocating the rod, and means for rotating said parts about the hollow shaft as a center.

24. In a traction-engine, the combination of a motor, an axle, a hollow shaft, means for connecting the axle and hollow shaft with the motor, two gears rotatably mounted on the hollow shaft, a second axle consisting of two parts in line with each other, a gear on each of said parts meshing with one of the first-mentioned gears, a clutch for rigidly connecting each of the first-mentioned gears with the hollow shaft, a rod in the hollow shaft connected with said clutches, means for reciprocating the rod, means for rotating said parts about the hollow shaft as a center, means for disconnecting said last-mentioned means, and means for simultaneously operating said disconnecting means and reciprocating said rod in the hollow shaft.

25. In a traction-engine, the combination of a motor, a rear axle, a hollow shaft, means for connecting the motor with the rear axle and hollow shaft independently of each other, two gears rotatably mounted on the hollow shaft, a second axle consisting of two parts in line with each other, a gear on each of said parts meshing with one of the first-mentioned gears, bearings for said parts of the second axle rigidly connected with each other, a clutch for rigidly connecting each of said first-mentioned gears with the hollow shaft, and means for operating said clutches.

In testimony whereof I have signed my name to this specification in the presence of two subscribing witnesses.

ROBERT REED.

Witnesses:
  MIDWEL F. MAHONEY,
  JOHN D. FERGUSON.